US010078867B1

(12) United States Patent
Chan et al.

(10) Patent No.: US 10,078,867 B1
(45) Date of Patent: Sep. 18, 2018

(54) AUGMENTED REALITY VIRTUAL BANKER

(71) Applicant: Wells Fargo Bank, N.A., San Francisco, CA (US)

(72) Inventors: Christin Chan, Pleasanton, CA (US); Erick Von Tengelitsch, II, Traverse City, MI (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/151,960

(22) Filed: Jan. 10, 2014

(51) Int. Cl.
*G06Q 40/06* (2012.01)
*G06Q 40/02* (2012.01)
*G06T 19/00* (2011.01)
*G06K 9/00* (2006.01)

(52) U.S. Cl.
CPC ......... *G06Q 40/02* (2013.01); *G06K 9/00469* (2013.01); *G06T 19/006* (2013.01)

(58) Field of Classification Search
USPC ............... 705/30, 14, 26; 382/117
See application file for complete search history.

(56) References Cited

U.S. PATENT DOCUMENTS

| 5,920,848 A | 7/1999 | Schutzer et al. |
| 5,947,526 A | 9/1999 | Neu |
| 7,254,548 B1 | 8/2007 | Tannenbaum |
| 7,337,947 B1 | 3/2008 | Swanson, Sr. |
| 7,481,359 B2 | 1/2009 | Kawase et al. |
| 7,634,662 B2 | 12/2009 | Monroe |
| 7,653,600 B2 | 1/2010 | Gustin et al. |
| 7,672,870 B2 | 3/2010 | Haines et al. |
| 7,980,462 B1 | 7/2011 | Graef et al. |
| 8,019,648 B2 * | 9/2011 | King et al. .................. 705/26.1 |
| 8,070,055 B2 | 12/2011 | Block et al. |
| 8,090,159 B2 | 1/2012 | Gabara |
| 8,244,002 B2 | 8/2012 | Chen et al. |
| 8,370,639 B2 | 2/2013 | Azar et al. |

(Continued)

FOREIGN PATENT DOCUMENTS

| CA | 2876928 | * | 1/2014 | ............. G06F 17/00 |
| JP | 2006-99445 A | | 4/2006 | |

(Continued)

OTHER PUBLICATIONS

"User Interfaces for Mobile Augmented Reality Display" by Tobias Hans Hollerer at Columbia University, 2004.*

(Continued)

*Primary Examiner* — Alexander G Kalinowski
*Assistant Examiner* — Blane A Lickteig
(74) *Attorney, Agent, or Firm* — Merchant & Gould P.C.

(57) ABSTRACT

A method implemented on an augmented reality electronic device includes viewing at least a portion of a financial document with the augmented reality electronic device. One or more words or phrases in a section of the financial document are identified using the augmented reality electronic device. A customer associated with the financial document is identified. An indication of the one or more words or phrases and an identification of the customer are sent to a server computer. Customized content is received from the server computer based on the one or more words or phrases and the identification of the customer. The customized content is displayed on the augmented reality electronic device.

18 Claims, 9 Drawing Sheets

(56) References Cited

U.S. PATENT DOCUMENTS

| | | | |
|---|---|---|---|
| 8,438,110 B2 | 5/2013 | Calman et al. | |
| 8,554,647 B1 | 10/2013 | Grigg et al. | |
| 8,594,931 B2 | 11/2013 | Sterkel et al. | |
| 8,639,622 B1 | 1/2014 | Moore et al. | |
| 8,751,393 B1* | 6/2014 | Murray | G06Q 40/02 705/35 |
| 8,935,799 B1* | 1/2015 | Anderson et al. | 726/26 |
| 2003/0105711 A1 | 6/2003 | O'Neil | |
| 2006/0031123 A1 | 2/2006 | Leggett et al. | |
| 2006/0218006 A1 | 9/2006 | Malik et al. | |
| 2007/0108275 A1 | 5/2007 | Shuster | |
| 2007/0233839 A1* | 10/2007 | Gaos | 709/223 |
| 2009/0138386 A1* | 5/2009 | Wilson et al. | 705/30 |
| 2010/0030578 A1 | 2/2010 | Siddique et al. | |
| 2010/0057574 A1 | 3/2010 | Banerjee et al. | |
| 2010/0153242 A1 | 6/2010 | Preston et al. | |
| 2010/0324727 A1 | 12/2010 | Eonnet | |
| 2011/0055049 A1 | 3/2011 | Harper et al. | |
| 2011/0099067 A1* | 4/2011 | Cooper | G06Q 30/02 705/14.53 |
| 2011/0150296 A1 | 6/2011 | Eckhoff et al. | |
| 2011/0153310 A1 | 6/2011 | Ehlen et al. | |
| 2011/0264470 A1 | 10/2011 | Miller | |
| 2011/0266340 A9 | 11/2011 | Block et al. | |
| 2012/0094639 A1 | 4/2012 | Carlson et al. | |
| 2012/0095853 A1 | 4/2012 | von Bose et al. | |
| 2012/0105476 A1 | 5/2012 | Tseng | |
| 2012/0136779 A1 | 5/2012 | Nonaka | |
| 2012/0185381 A1 | 7/2012 | Kim | |
| 2012/0192235 A1 | 7/2012 | Tapley et al. | |
| 2012/0197773 A1 | 8/2012 | Grigg et al. | |
| 2012/0212414 A1 | 8/2012 | Osterhout et al. | |
| 2012/0216149 A1 | 8/2012 | Kang et al. | |
| 2012/0218188 A1 | 8/2012 | Kashitani | |
| 2012/0230577 A1* | 9/2012 | Calman | G06Q 20/042 382/138 |
| 2012/0231424 A1 | 9/2012 | Calman et al. | |
| 2012/0231814 A1 | 9/2012 | Calman et al. | |
| 2012/0232937 A1 | 9/2012 | Calman et al. | |
| 2012/0232966 A1 | 9/2012 | Calman et al. | |
| 2012/0232968 A1 | 9/2012 | Calman et al. | |
| 2012/0232976 A1 | 9/2012 | Calman et al. | |
| 2012/0232977 A1 | 9/2012 | Calman et al. | |
| 2012/0233015 A1 | 9/2012 | Calman et al. | |
| 2012/0233032 A1 | 9/2012 | Calman et al. | |
| 2012/0233072 A1 | 9/2012 | Calman et al. | |
| 2012/0239564 A1 | 9/2012 | Summerrow et al. | |
| 2012/0242696 A1* | 9/2012 | Martin | G06F 3/011 345/633 |
| 2012/0303528 A1 | 11/2012 | Weiner et al. | |
| 2012/0320216 A1 | 12/2012 | Mkrtchyan et al. | |
| 2013/0016123 A1 | 1/2013 | Skarulis | |
| 2013/0030994 A1 | 1/2013 | Calman et al. | |
| 2013/0033522 A1 | 2/2013 | Calman et al. | |
| 2013/0046633 A1 | 2/2013 | Grigg et al. | |
| 2013/0060691 A1 | 3/2013 | Typrin et al. | |
| 2013/0093759 A1 | 4/2013 | Bailey | |
| 2013/0208234 A1 | 8/2013 | Lewis | |
| 2013/0215116 A1 | 8/2013 | Siddique et al. | |
| 2013/0222369 A1 | 8/2013 | Huston et al. | |
| 2013/0228615 A1 | 9/2013 | Gates et al. | |
| 2013/0229261 A1 | 9/2013 | Gates et al. | |
| 2013/0232048 A1 | 9/2013 | Corner | |
| 2013/0282542 A1 | 10/2013 | White | |
| 2014/0012691 A1 | 1/2014 | Hanson et al. | |
| 2014/0075528 A1* | 3/2014 | Matsuoka | G06F 21/32 726/7 |
| 2014/0147004 A1* | 5/2014 | Uchida | G06K 9/00442 382/103 |
| 2014/0181741 A1* | 6/2014 | Apacible et al. | 715/810 |
| 2014/0236789 A1 | 8/2014 | Caldwell | |
| 2014/0244266 A1* | 8/2014 | Brown | G06F 9/453 704/275 |
| 2014/0298235 A1 | 10/2014 | Caldwell | |
| 2014/0341441 A1* | 11/2014 | Slaby | G06F 21/32 382/117 |
| 2014/0372427 A1* | 12/2014 | Lehmann et al. | 707/736 |
| 2015/0012426 A1 | 1/2015 | Purves et al. | |
| 2015/0127541 A1 | 5/2015 | Just et al. | |
| 2016/0070581 A1* | 3/2016 | Soon-Shiong | G06Q 50/10 715/706 |

FOREIGN PATENT DOCUMENTS

| | | |
|---|---|---|
| KR | 10-2004-0026913 A | 4/2004 |
| KR | 10-2008-0042374 A | 5/2008 |
| KR | 10-2011-0078913 A | 7/2011 |
| KR | 10-2011-0136457 A | 12/2011 |

OTHER PUBLICATIONS

Augmented Reality, Tommytoy.typepad.com, https://web.archive.org/web/20130901224748/http://tommytoy.typepad.com/tommy-toy-pbt-consultin/augmented-reality/, 69 pages (Aug. 6, 2013).

Bass, T., "Dress Code," http://archive.wired.com/wired/archive/6.04/wearables_pr.html, 10 pages (Copyright 1993-2004).

Bray, A., "Google Glass will Change Your Branches," http://www.americanbanker.com/bankthink/google-glass-will-change-your-branches-1057312-1.html, 6 pages (Mar. 7, 2013).

Elash, A. et al., "Canadian casinos, banks, police use facial-recognition technology," The Globe and Mail, http://www.theglobeandmail.com/news/national/time-to-lead/canadian-casinos-banks-police-use-facial-recognition-technology/article590998/, 4 pages (Sep. 6, 2012).

Harper, S. et al., "Sentinel: Universal Access to Ambient Devices," http://citeseerx.ist.psu.edu/viewdoc/download?doi=10.1.1.59.6168&rep=rep1&type=pdf, 5 pages (2003).

Leiva-Gomez, M., "Cameras Scanning Credit Cards? Is That Even Secure?, http://www.mobilecommerceinsider.com/topics/mobilecommerceinsider/articles/344823-cameras-scanning-credit-cards-that-even-secure.htm, 3 pages (Jul. 8, 2013).

Lotte Credit Card Releases Asia's First Financial Mobile App with Augmented Reality for iPhone and Android Devices, PRWeb, http://www.prweb.com/releases/worklight/mobile-platform/prweb5210334.htm, 3 pages (Mar. 30, 2011).

Mok, S. et al., "Addressing Biometrics Security and Privacy Related Challenges in China," Proceedings of the International Conference o the Biometrics Special Interest Gropu (BIOSIG), 8 pages (Sep. 6-7, 2012).

Prindle, D., "Best Augmented Reality Apps," https://web.archive.org/web/20130407024439/http://www.digitaltrends.com/mobile/best-augmented-reality-apps/, 23 pages (Jan. 29, 2013).

Salo, M. et al., "Consumer value of camera-based mobile interaction with the real world," Pervasive and Mobile Computing, vol. 9, pp. 258-268 (2013).

Sterling, G., "Mobile Credit-Card Scanning Should be Ubiquitous," http://internet2go.net/news/local-search/credit-card-scanning-should-be-ubiquitous-mobile, 2 pages (Jul. 29, 2013).

Tatton, E., "Google Glass—Draft Document," https://prezi.com/kfvacljxv7fg/google-glass-draft-document/, 7 pages (May 6, 2013).

U.S. Appl. No. 14/143,633, filed Dec. 30, 2013 entitled "Augmented Reality Enhancements for Financial Activities".

U.S. Appl. No. 14/143,658, filed Dec. 30, 2013 entitled "Augmented Reality Enhancements for Financial Activities".

U.S. Appl. No. 14/151,965, filed Jan. 10, 2014 entitled "Augmented Reality for Finiancial Budgeting and Spending".

Yamashita, A. et al., "Assisting system of visually impaired in touch panel operation using stereo camera," 18th IEEE International Conference on Image Processing (ICIP), http://sensor.eng.shizuoka.ac.jp/~yamasita/paper/B/B067Final.pdf, 4 pages (Sep. 11-14, 2011).

Yayla, A. et al., "An Exploration of Using Face Recognition Technologies for National Security," Turkish Journal of Police Studies, vol. 6, No. 1-2, pp. 141-157 (2004).

\* cited by examiner

US 10,078,867 B1

AUGMENTED REALITY VIRTUAL BANKER

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality electronic device, the method comprising: viewing at least a portion of a financial document with the augmented reality electronic device; identifying one or more words or phrases in a section of the financial document using the augmented reality electronic device; identifying a customer associated with the financial document; sending an indication of the one or more words or phrases and an identification of the customer to a server computer; receiving customized content from the server computer based on the one or more words or phrases and the identification of the customer; and displaying the customized content on the augmented reality electronic device.

In another aspect, a method implemented on an augmented reality electronic device comprises: viewing at least a portion of a financial document with the augmented reality electronic device; identifying one or more words or phrases in a section of the financial document using the augmented reality electronic device; identifying a customer associated with the financial document; sending the one or more words or phrases and an identification of the customer to a server computer; receiving customized content for the financial document from the server computer, the customized content based on the one or more words or phrases and the identification of the customer; displaying the customized content on the augmented reality electronic device, the customized content including one or more actionable items, the display of the customized content including at least one actionable area on a display area of the augmented reality electronic device; receiving a user input from the actionable area; sending an indication of the user input to the server computer; receiving additional content from the server computer based on the user input; and displaying the additional content on the augmented reality electronic device.

In yet another aspect, an augmented reality electronic computing device comprises: a processing unit; and system memory, the system memory including instructions which, when executed by the processing unit, cause the augmented reality electronic computing device to: view at least a portion of a financial document; identify one or more words or phrases in a section of the financial document; send the one or more words or phrases and an identification of the customer to a server computer; receive customized content from the server computer based on the one or more words or phrases and the identification of the customer; and display the customized content.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for using augmented reality (AR) to provide enhanced information when reading a banking statement or similar types of financial documents. As described in this disclosure, by viewing a banking statement with an AR device, additional information relevant to the banking statement is displayed on the AR device. In some implementations, the AR device is an AR headset. In other implementations, the AR device is a smart telephone or laptop computer having an AR software application. As described in this disclosure, the display of enhanced information for a banking statement is an example of virtual banking.

The systems and methods are generally described for an AR headset that may be worn by a user. The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability. The biometric capability permits biometric authentication of the user, as described in more detail later herein.

One type of AR headset described in this disclosure is a smart glass type of headset, similar to eyeglasses, that may be worn by the user. The user may view AR images in the glass portion of the headset. An example of a smart glass headset is Google Glass, from Google Inc. of Mountain View, Calif.

The systems are methods are also described for a smart telephone or laptop computer having an AR software application. The smart telephone and laptop computer each includes a camera that may be used to view a banking statement or other similar type of financial document. The AR software application may display information relevant to the banking statement on a display screen of the smart telephone or laptop computer. For example, the AR software application may display a graph showing a trend of assets and liabilities for a customer associated with the banking statement.

Figure 1:
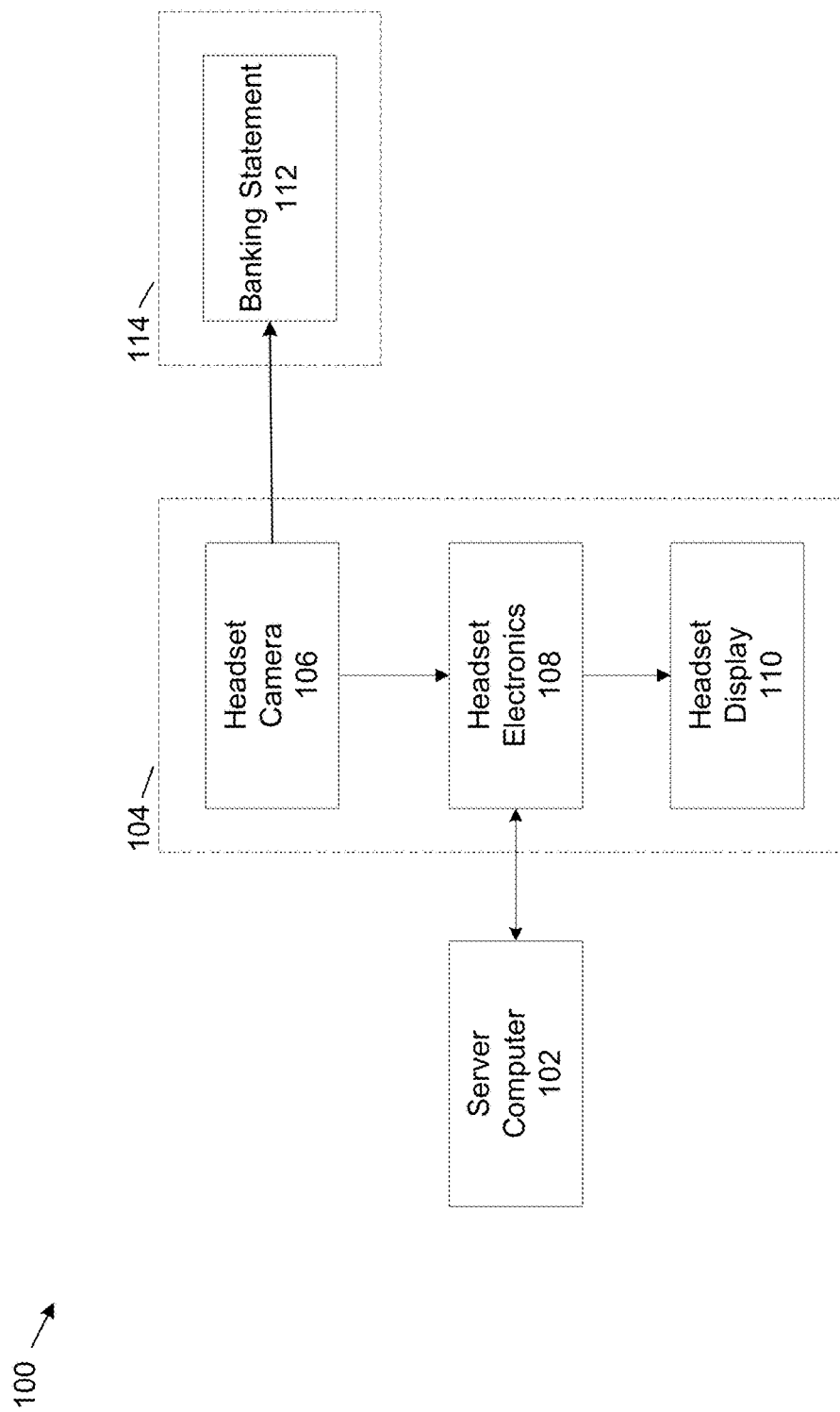
FIG. 1 shows an example system in which augmented reality (AR) may be used to provide a virtual banking capability.

FIG. 1 shows an example system 100 for which AR may be used to provide a virtual banking capability for a user. The example system 100 includes a server computer 102, an AR headset 104 and a mobile electronic device 114. The example AR headset 104 includes a headset camera 106, headset electronics 108 and a headset display 110. The mobile electronic device 114 includes a banking software application from which an example banking statement may be displayed on the mobile electronic device 114. The mobile electronic device 114 is typically a smart telephone or a laptop computer.

The example server computer 102 is typically a server computer at a bank or other financial institution. A wireless connection may be established between the AR headset 104 and the server computer 102. Information relating to the user's banking statement may be transmitted from server computer 102 to AR headset 104.

The example AR headset 104 includes a headset camera 106, headset electronics 108 and a headset display 110. The example headset camera 106 is a camera that is typically mounted to the headset such that a lens of the camera has a same orientation as the user. When the user looks at an object or a scene, the camera is positioned to record or transmit what the user sees. The headset electronics 108 includes an electronic computing device with wireless capability. The wireless capability may include Bluetooth, radio frequency identification (RFID) or similar types of wireless capability. The headset electronics 108 may also include optical character recognition (OCR).

In an example implementation, the user may display the banking statement 112 on the mobile electronic device 114. As discussed in more detail later herein, the banking statement 112 may be displayed via a user interface of a mobile banking software application on the mobile electronic device 114. A user wearing the AR headset 104 may view the banking statement 112 via the headset camera 106. Alternatively, the AR headset 104 may view a hard copy of the banking statement 112.

When the user focuses the AR headset 104 on a specific section of the banking statement 112, the headset camera 106 captures one or more keywords or phrases in the section of the banking statement 112. The keywords are specific words that relate to banking or financial transactions. Some example keywords that may be captured include account, balance, asset, liability, stock, transaction, and statement. More, fewer or different keywords may be captured. The keywords may be captured alone or in combination with other words, for example "mutual fund."

In some implementations, the headset camera 106 may capture other identifiers in addition to keywords or phrases. For example, some financial documents may include built-in identifiers that may provide augmented content. One standard identifier that may be included in a financial document is a QR (quick response) code. Other identifiers may be included that may be recognized by an AR device and thereupon AR content may be provided. In this disclosure, example implementations are described for capturing keywords and phrases. Operations implemented using the keywords or phrases may also be applicable to any other identifiers that may be captured.

The one or more keywords, an account identification number and an authentication indication for the user are sent via a wireless connection to server computer 102. The account identification number identifies a customer associated with the banking statement 112. The authentication verifies that the wearer of the AR headset 104 either is the customer associated with the banking statement 112 or is authorized to view the banking statement 112.

When the user is authenticated and when server computer 102 processes the keywords, financial information related to the section of the document is displayed on the headset display 110. In some implementations, the financial information is displayed such that when the banking statement 112 is viewed via the AR headset 104, the financial information overlays the banking statement 112 on the headset display 110. In other implementations, the financial information is displayed on the headset display 110 independently of the banking statement 112.

The user may be authenticated in one or more ways. One way of authenticating the user is via biometric authentication, typically by one or more of facial recognition, retinal scan, finger print scan or voice print, as discussed in more detail later herein. Another way of authenticating the user is by having the user utter a personal identification number (PIN) that may be assigned to the user for AR applications. In some implementations, a combination of facial recognition and a PIN may be used.

In some implementations, the account number in combination with an indication of user authentication may be sufficient authorization for the server computer 102 to send the financial information related to the identified section of the document. The account number may be obtained by the AR headset 104 from the banking statement. In some implementations, the PIN is correlated with the user's account number. In these implementations, once the user is authenticated, server computer 102 uses the PIN to access a proper account number for the user.

Each time the user focuses the AR headset 104 onto a different section of the banking statement, keywords obtained from these sections of the banking statement may be used by server computer 102 to send customized financial information related to these sections to the AR headset 104. Examples of customized financial information that may be displayed include a graph showing a balance trend of assets and liabilities for the user, marketing information such as information about a bank credit card rewards program, a graph showing performance data for a stock or mutual fund, and links to educational videos regarding personal banking, etc. Other types of financial information may be displayed.

In some implementations, the AR headset 104 may process keywords, phrase and other identifiers independently of the server computer 102. In these implementations, instead of sending the keywords and phrases to the server computer 102, only the customer identification and authentication information may be sent to the server computer 102. In some implementations, an indication of the keywords and phrases is sent to the server computer 102 instead of the actual keywords and phrases. In some implementations, the customized financial information may be generated by an AR software application on the AR headset 104 or other AR device.

Figure 2:
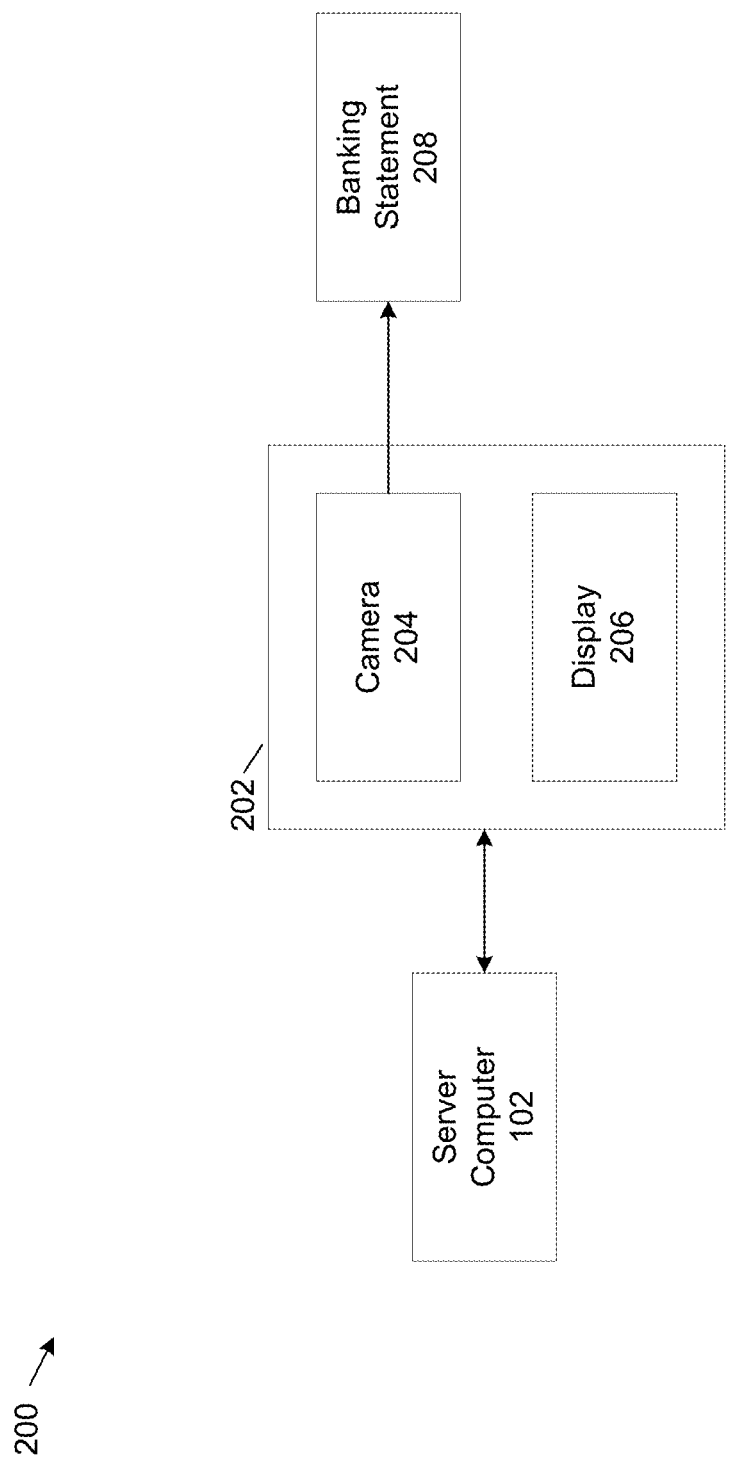
FIG. 2 shows another example system in which AR may be used to provide a virtual banking capability.

FIG. 2 shows another example system 200 for which AR may be used to provide a virtual banking capability for a user. In the system 200, AR is implemented via an AR software application on a mobile electronic device. The system 200 includes server computer 102, mobile electronic device 202 and banking statement 208. The mobile electronic device 202 includes a camera 204 and a display 206. The banking statement 208 may be a hard-copy statement that may be viewed and scanned by the camera 204.

In an example implementation, the camera 204 on the mobile electronic device 202 focuses on the banking statement 208 and displays the banking statement 208 on the display 206. In the example system 200, the banking statement 208 is a hard copy banking statement. When the camera zooms in on a specific section of the banking statement 208, one or more keywords in the section of the banking statement 208 are scanned into the mobile electronic device 202. In some implementations, the AR software application is activated when the banking statement 208 is scanned. In other implementations, the AR software application is activated when the mobile electronic device 202 is turned on.

The keywords and account information are sent to server computer 102. The account information is corresponds to an account associated with the banking statement 208. The account number is number is known when the user logs on to a mobile banking software application on the mobile electronic device 202 and displays the banking statement 208 on the mobile electronic device 202.

Based on the one or more keywords, corresponding to the section of the banking statement 208 that is scanned, the server computer 102 sends customized financial information to the mobile electronic device 202. The customized financial information may include customized content, a message or a combination of content and a message. The content and message are customized based on an evaluation of the keywords. For example, when the keywords indicate that the section of the banking statement 208 is related to asset allocation, the server computer 102 may send information to the mobile electronic device 202 regarding a current asset allocation for the user. The server computer may also send a message, for example from a virtual banker, as discussed later herein.

In some implementations, the customized financial information is displayed as an overlay of the banking statement 208. The overlay may be displayed in conjunction with the camera 204 view of the banking statement 208 on the mobile electronic device 202. For example, with the overlay, the user may be able to view both the banking statement 208 and the customized financial information. In this way the customized financial information augments data in the banking statement 208. In other implementations, the customized financial information may comprise a new display that replaces the banking statement 208 on the mobile electronic device 202.

Figure 3:
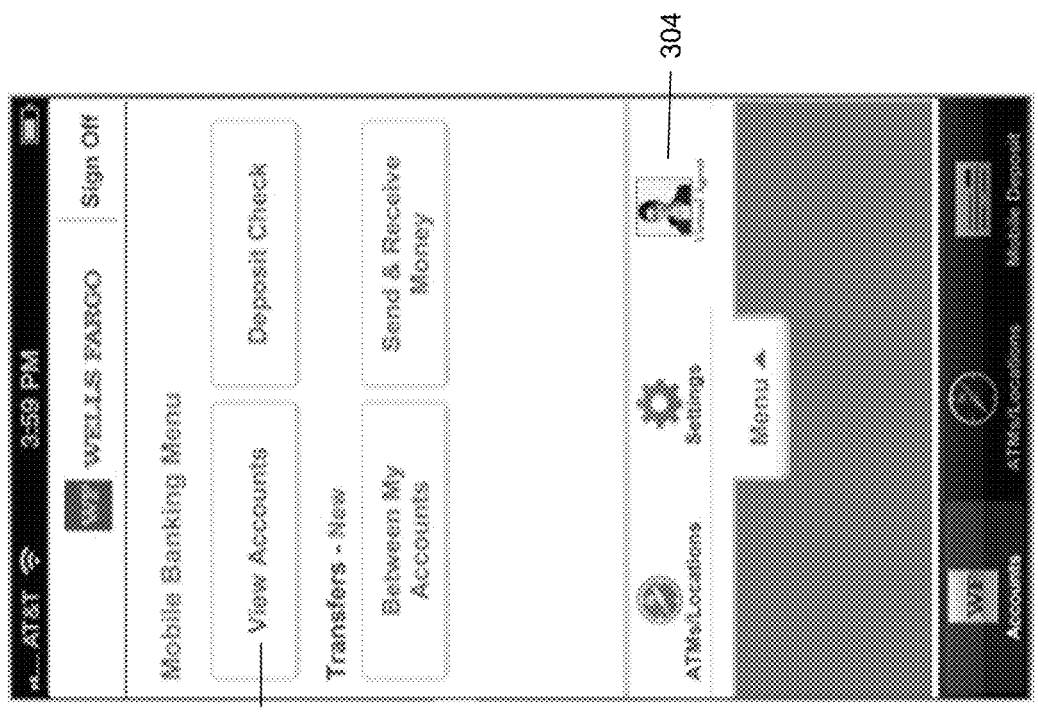
FIG. 3 shows an example mobile banking menu that may be displayed on the mobile electronic device of FIG. 2.

FIG. 3 shows an example mobile banking menu 300 that may be displayed on the mobile electronic device 202. The mobile banking menu 300 is displayed when the user signs-on to the user's online banking account on the mobile electronic device 202. The mobile banking menu 300 includes a view accounts button 302 and a virtual agent button 304. The view accounts button 302 permits the user's banking statement to be displayed. The virtual agent button 304 brings up an instant messaging window in which a real-time conversation may be started with a virtual banking agent.

When the view accounts 302 button is activated, a banking statement for the user may be displayed on the mobile electronic device 202. When the user views the banking statement with an AR headset, for example with AR headset 104, the user may focus on a specific section of the banking statement with the AR headset. In some implementations, focusing on a specific section of the banking statement with the AR headset, automatically causes a camera on the AR headset, for example headset camera 106, to capture one or more key words from the section of the banking statement focused on by the AR headset. As discussed, the keywords, the user's online banking account number and an indication of authentication for the user are sent to server computer 102. Customized financial information relating to the section of the banking statement is then sent to the AR headset 104.

As discussed, the customized financial information may be displayed on a display device of AR headset 104, for example on headset display 110. In some implementations, the customized financial information is displayed as an overlay of the banking statement. When displayed as an overlay, the customized financial information occupies a similar space as the banking statement, so that when the user views the banking statement with the AR headset 104, the customized financial information is overlaid on the banking statement as viewed with the AR headset 104. In other implementations, for example when the AR device is the mobile electronic device 202, the customized financial information may be displayed on the display 206 as a separate screen, so that the display of the customized financial information blocks out the banking statement when displayed. As discussed earlier herein, the customized financial information may also be displayed in conjunction with the camera 204 as an overlay on the mobile electronic device 202.

Figure 4:
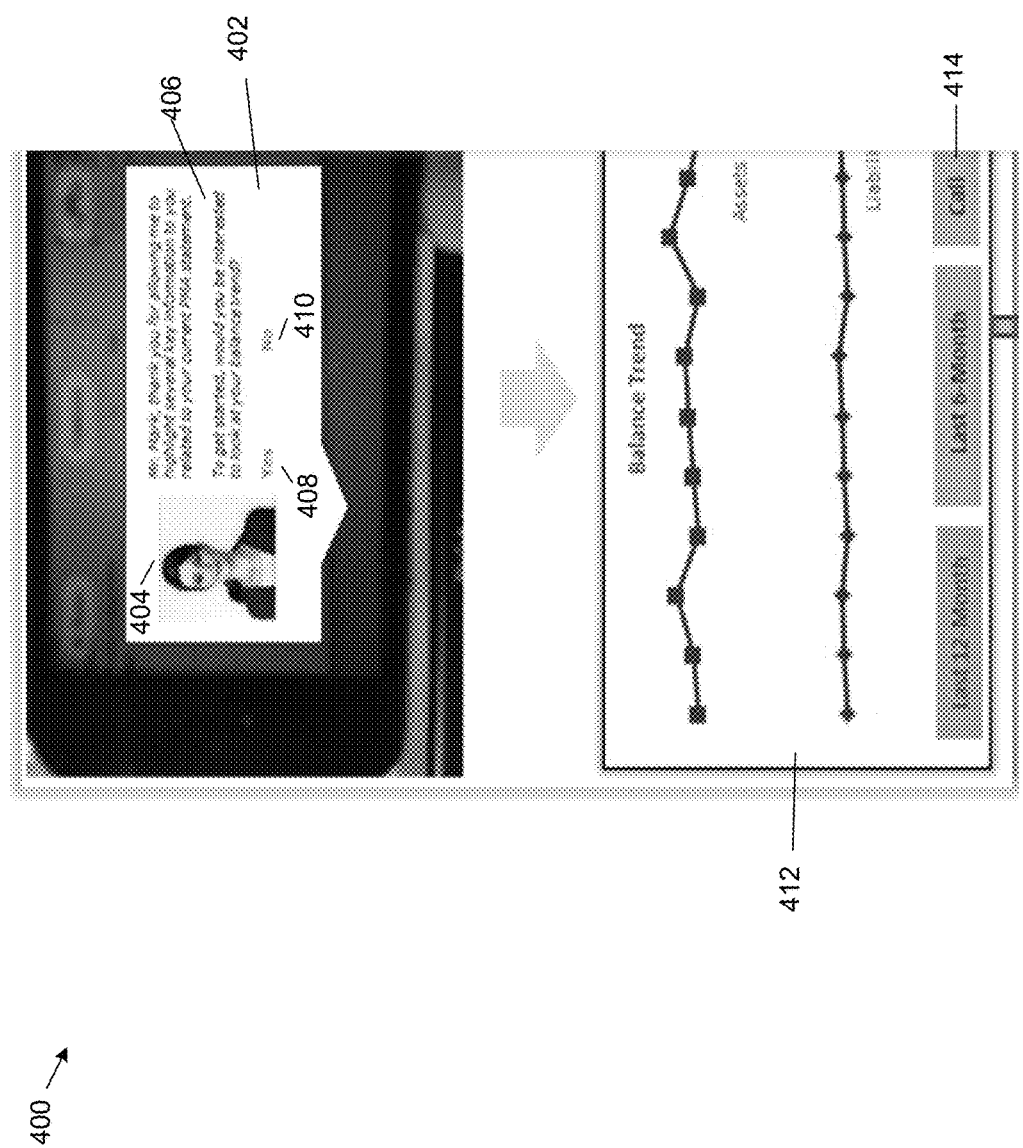
FIG. 4 shows an example display of augmented financial information on the AR headset of FIG. 1.

FIG. 4 shows an example display 400 of the customized financial information on the AR headset 104. The display 400 also includes a dialog area 402 for an online conversation with a virtual banker. The display 400 includes a graphic 412 showing a trend of assets and liabilities for the use over time.

The example dialog area 402 may be displayed automatically by the AR software application based on an evaluation of the section of the banking statement at the server computer 102. The evaluation makes use of business rules in an algorithm used by an AR software application on server computer 102. For example, an evaluation of the keywords sent to server computer 102 may indicate that it may be useful to display a balance trend of assets and liabilities for the users. Based on this evaluation using the business rules, the AR software application may display dialog area 402 on the headset display 110.

In the example dialog area 402, a photo 404 of a virtual banker may be displayed along with a message 406 from the virtual banker. In this example, the message asks the user whether the user would be interested in viewing the balance trend. A yes button 408 and a no button 410 are displayed along with the message 406. When the user selects the yes button 408, the example graphic 412 is displayed. In some implementations, the user may select the yes button 408 by touching the yes button 408 area on the display 400. In other implementations, the user may simply utter the word "yes."

The graphic 412 includes graphs showing a trend over time for the assets and liabilities of the user. As shown in FIG. 4, the trend may be shown in time periods for the last 12-months or the last 6-months. The graphic 412 also includes a call button 414 for calling for additional information and speaking to a bank employee.

The call button 414 is an example of how the customized financial information displayed on the AR headset 104 may become actionable. In this case, the action is to call a bank employee, for example a personal banker.

Figure 5:
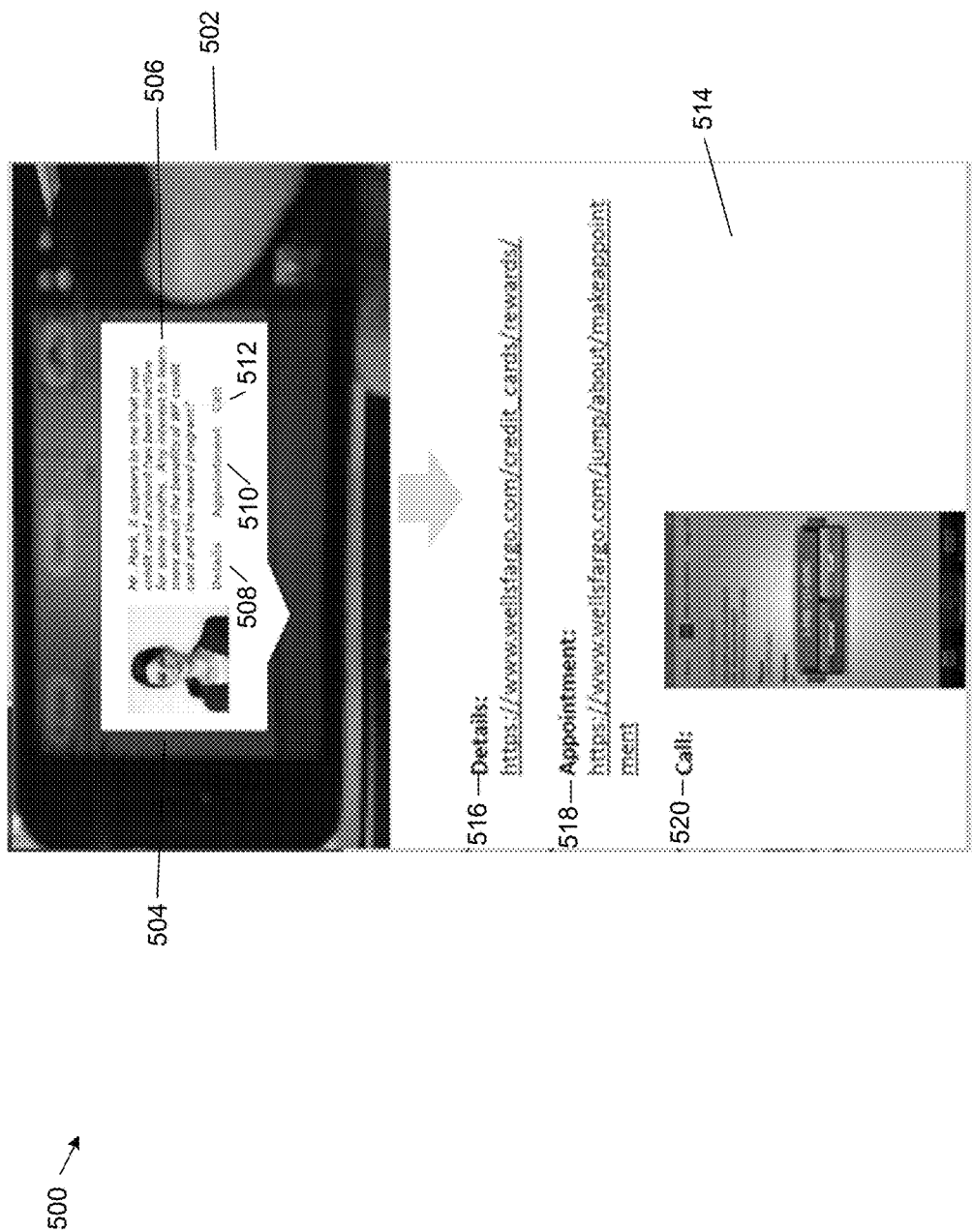
FIG. 5 shows another example display of augmented financial information on the AR headset of FIG. 1.

FIG. 5 shows another display 500 of the customized financial information on the AR headset 104. The display 500 includes a dialog area 502 and an information area 514. The dialog area 502 is displayed on the AR headset 104 based on an evaluation of the key words received at server computer 102 in accordance with business rules regarding the key words. The information area 514 is displayed based on a user action in the dialog area 502.

The example dialog area 502 includes a photo 504 of a virtual banker and a message 506 from the virtual banker. The dialog area 502 also includes buttons corresponding to actions the user may take based on the message 506. In this example, the message 506, based on the keywords and other information available at the server computer 102, indicates that the user's credit card has been inactive for several months. The message 506 further includes an inquiry as to whether the user would be interested in viewing details about a bank credit card rewards program.

The dialog area 502 includes three buttons corresponding to actions the user may take. The buttons include a details button 508, an appointment button 510 and a call button 512. When the details button 508 is selected, a hyperlink is displayed for a website that may provide information about the bank credit card rewards program. When the appointment button 510 is selected, a hyperlink is displayed for a website that can be used to make an appointment with a personal banker. When the call button 512 is selected, a dialog box is displayed that permits activation of a telephone call to a bank employee, typically a personal banker.

In some implementations, selecting one of the details button 508, appointment button 510 and call button 512, results in a display of information pertaining to the credit and rewards program, the appointment with the personal banker and the telephone call to the bank employee, respectively. In other implementations, selection of anyone of the details button 508, appointment button 510 and call button 512 results in a display of information area 514, providing information regarding each of the bank credit card rewards program, the appointment with the personal banker and the telephone call to the bank employee.

The example information area 514 includes a details area 516, an appointments area 518 and a call area 520. The example details area 516 includes a hyperlink for obtaining information for the bank credit card rewards program. The example appointments area 518 includes a hyperlink for the website that can be used to make an appointment with the personal banker. The example call area 520 displays the dialog box that permits activation of the telephone call to the bank employee, typically a personal banker.

Figure 6:
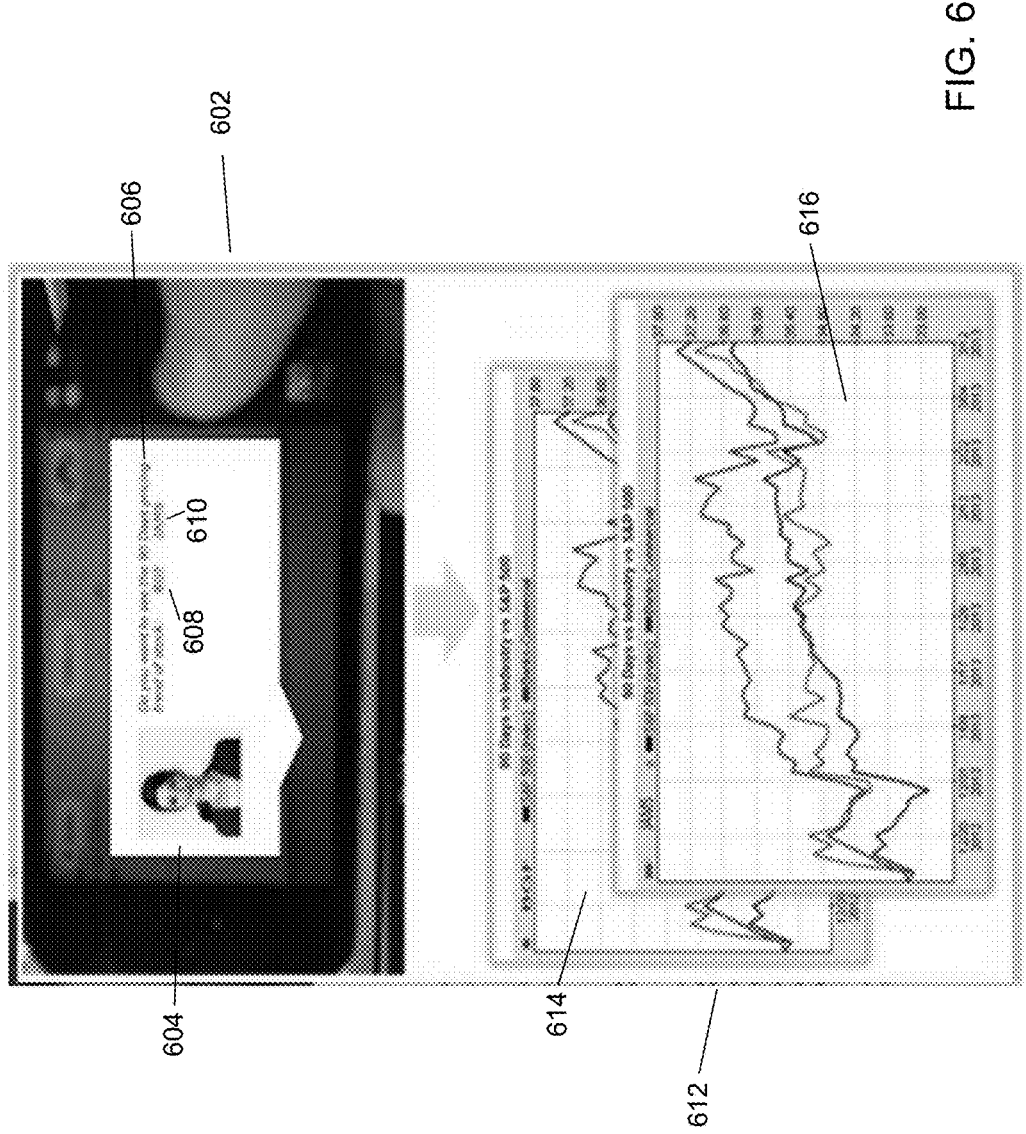
FIG. 6 shows yet another example display of augmented financial information on the AR headset of FIG. 1.

FIG. 6 shows another display 600 of the customized financial information on the AR headset 104. The display 600 includes a dialog area 602 and an information area 612. The dialog area 602 is displayed on the AR headset 104 based on an evaluation of the keywords received at server computer 102 in accordance with business rules regarding the keywords. The information area 614 is displayed based on a user action in the dialog area 602.

The example dialog area 602 includes a photo 604 of the virtual banker and a message 606 from the personal banker. The dialog area 602 also includes buttons corresponding to actions the user may take based on the message 606. In this example, the message, based on the keywords and other information available at the server computer 102, inquires of the user whether the user would like to see 90 day pricing for either or both of two stocks. For this example, the section of the banking statement viewed by the AR device may have indicated that the user owns the two stocks and the key words may have included stock market symbols corresponding to the two stocks.

One button 608 corresponds to example symbol BGF for a first stock and a second button 610 corresponds to example symbol JAMS for a second stock. When either button 608 or button 610 is selected, the information area 612 is displayed. The example information area 612 includes one graph showing 90-day performance of the BGF stock and another graph showing 90-day performance of the JAMS stock.

Figure 7:
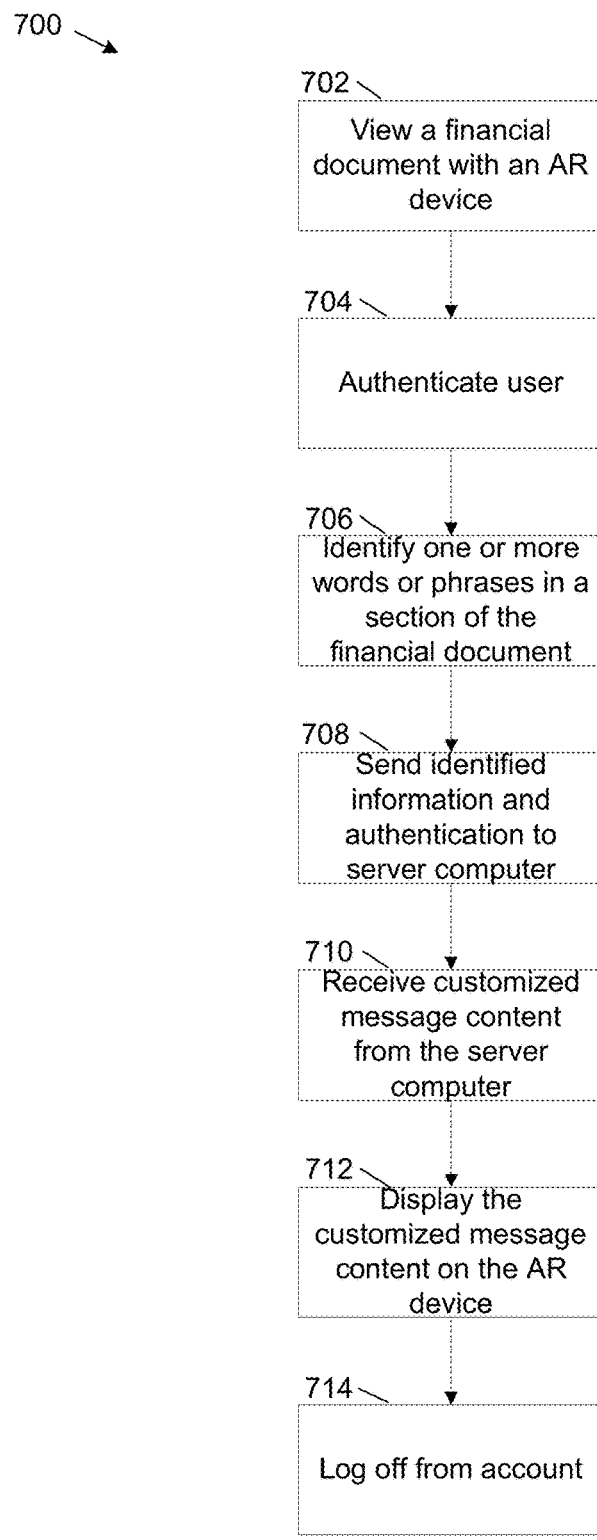
FIG. 7 shows a flowchart for an example method for displaying augmented financial information on the AR headset of FIG. 1.

FIG. 7 shows a flowchart of a method 700 for displaying augmented financial information for a banking statement on an AR device. In some implementations, the AR device is an AR headset, similar to AR headset 104. In other implementations, the AR device is a mobile electronic device, similar to mobile electronic device 202 and AR functionality is provided via an AR software application running on the mobile electronic device.

At operation 702, a financial document is viewed by a user using an AR device. In a typical implementation, the financial document is displayed on a mobile electronic device, for example mobile electronic device 114, using a banking financial application on the mobile electronic device 14. In this implementation, the AR device is an AR headset device, for example AR headset device 104. In another implementation, the financial document may be a hard copy banking statement and the AR device is the mobile electronic device 202. In this implementation, the mobile electronic device 202 includes an AR software application.

In some implementations, mobile electronic device 114 and mobile electronic device 202 are the same physical device. In other implementations they are separate device. For example, in some implementations mobile electronic device 114 may include a mobile financial banking software application but not an AR software application. In some implementations, mobile electronic device 202 may include both a mobile financial banking software application and an AR software application. Other combinations of software applications are possible.

At operation 704, the user is authenticated. Authentication comprises verifying an identity of the user of the AR device and determining that the user of the AR device is authorized to view the financial document. When the AR device is the AR headset device 104, authentication typically is done by a biometric authentication method, such as facial recognition, retinal scan, finger print scan or voice print. When the AR device is the mobile electronic device 202, authentication is typically done via the user of a password or PIN on the mobile electronic device 202. In some implementations, when the AR device is the mobile electronic device 202, authentication may also be done via biometric authentication, using the AR software application on the mobile electronic device 202.

At operation 706, one or more keywords or phrases are identified in a section of the financial document. The AR device focuses on a specific section of the financial document and the section of the financial document is scanned by the AR device. For example, when the AR device is the AR headset device 104, when the user focuses headset camera 106 on the specific section of the financial document, that section of the financial documented is scanned by headset camera 106. The scanned section is analyzed using an AR software application running on the AR headset device 104. The AR software application identifies the one or more keywords or phrases. When the AR device is the mobile electronic device 202, the camera 204 on the mobile electronic device 202 may be used to focus on a section of a hard copy financial document. The section of the hard copy financial document is scanned in using the AR software application running on the mobile electronic device 202. The scanned section is analyzed using the AR software application running on the mobile electronic device 202 and one or more keywords or phrases from the scanned section of the document are identified.

At operation 708, the identified keywords and phrases and an indication of user authentication are sent to server computer 102. Server computer 102 includes an AR software application program that includes rules for analyzing the keywords and phrases. The rules are used to look up customer information related to the keyword and phrases. The customer information may be stored on server computer 102 or a data store or other server computer accessible from server computer 102. The AR software application program on server computer 102 determines customized content that may be displayed to the user to augment information on the financial document. For example, as discussed earlier, the customized information may include a graph showing a balance trend or an asset allocation for the user.

At operation 710, customized information is received at the AR device from the server computer 102 and at operation 712, the customized information is displayed on the AR device. When the AR device is AR headset 104, the customized information is displayed on the headset display 110. In some implementations the customized information is displayed as an overlay of the financial document when the financial document is viewed via AR headset 104. In other implementations, the customized information is displayed on the headset display 110 independently of the financial document.

When the AR device is mobile electronic device 202, the customized financial information is displayed on the mobile electronic device 202. In some implementations, the customized financial information may be displayed as an overlay of the financial document, as viewed by the camera 204 on the mobile electronic device 202. In other implementations, the customized financial information may be displayed within a financial application display screen on the mobile electronic device 202.

At operation 714, the user logs off from the user's financial account. When the AR device is the AR headset 104, the user may log off by simply looking away from the financial document for greater than a predetermined period of time, for example 30 seconds. When the AR device is the mobile electronic device 202, the user may log off by turning off the camera 204.

Figure 8:
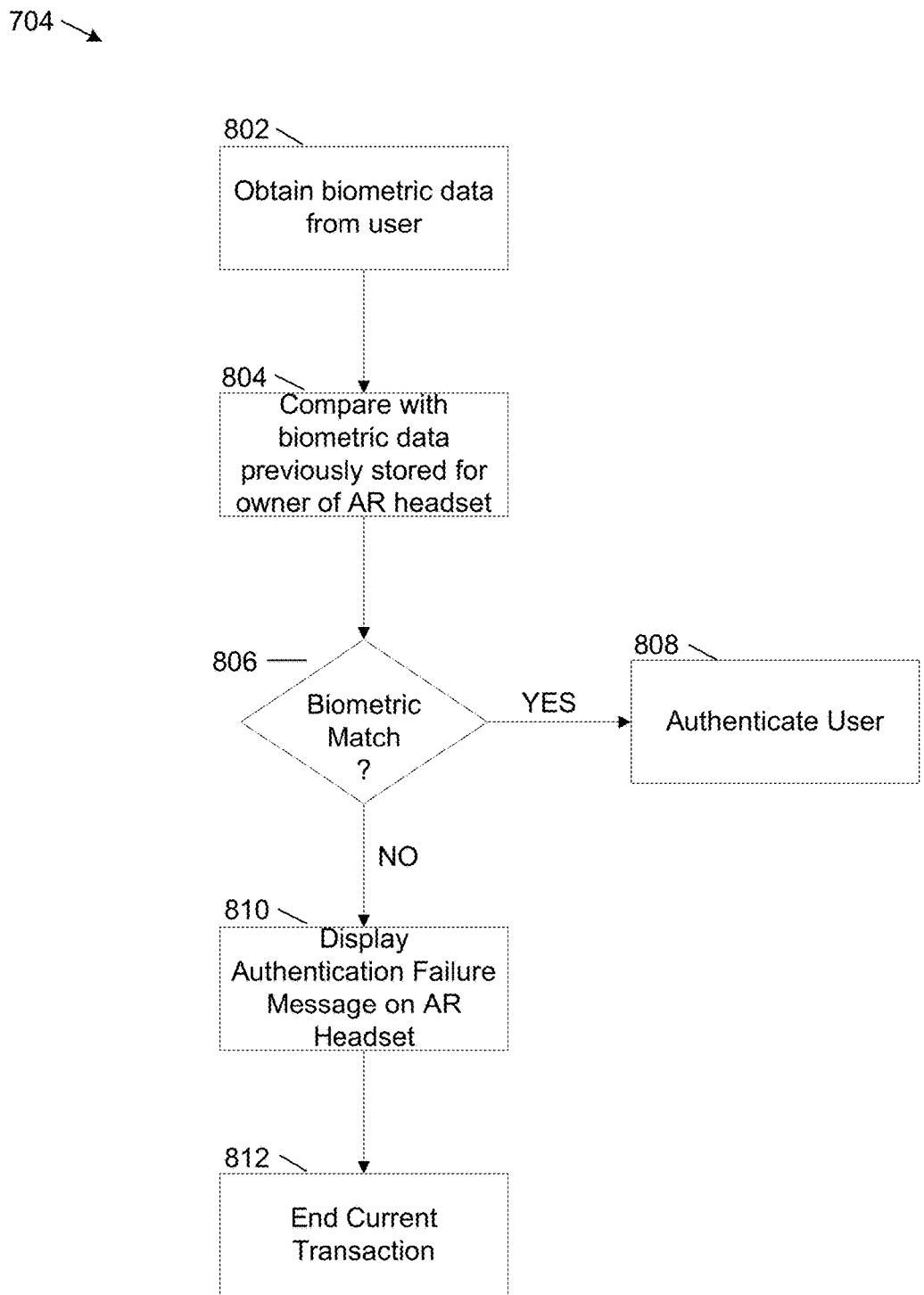
FIG. 8 shows a flowchart of an example method for authenticating a user.

FIG. 8 shows a flowchart of a method for the operation 704 for authenticating the user. At operation 802, biometric information is obtained from the user. Typically, the biometric information is obtained from one of facial recognition, retinal scan, voice print or finger print scan. Facial recognition comprises scanning the user's face with the headset camera 106 and extracting specific facial features from the scanned image of the user's face. Retinal scan uses unique patterns on the user's iris in order to identify the user. Voice print obtains a spectrogram of the user's voice, for example when the user utters a command. Finger print scan uses finger print recognition to identify the user. In some implementations, finger print recognition hardware and software is built into the AR device. For example, when the user touches the headset display 110, the user's finger print may be scanned.

At operation 804, the biometric information for the user obtained at operation 802 is compared with previously obtained biometric information for the user. Typically, when the user is assigned an AR device, a biometric profile is compiled for the user and stored on the AR device. The profile may include one or more of a facial profile, a retinal profile, a voice print and a finger print.

At operation 806, a determination is made as to whether the biometric information obtained at operation 802 matches the previously obtained biometric information for the user. When a determination is made that there is a match, at operation 808, the user is designated as being authenticated.

When a determination is made that there is not a match, at operation 810, a message is displayed on the headset display 110 indicating that there is an authentication failure and that the current transaction (for example displaying payment card financial information on the AR device) has been ended.

At operation 812, the current transaction is ended.

Figure 9:
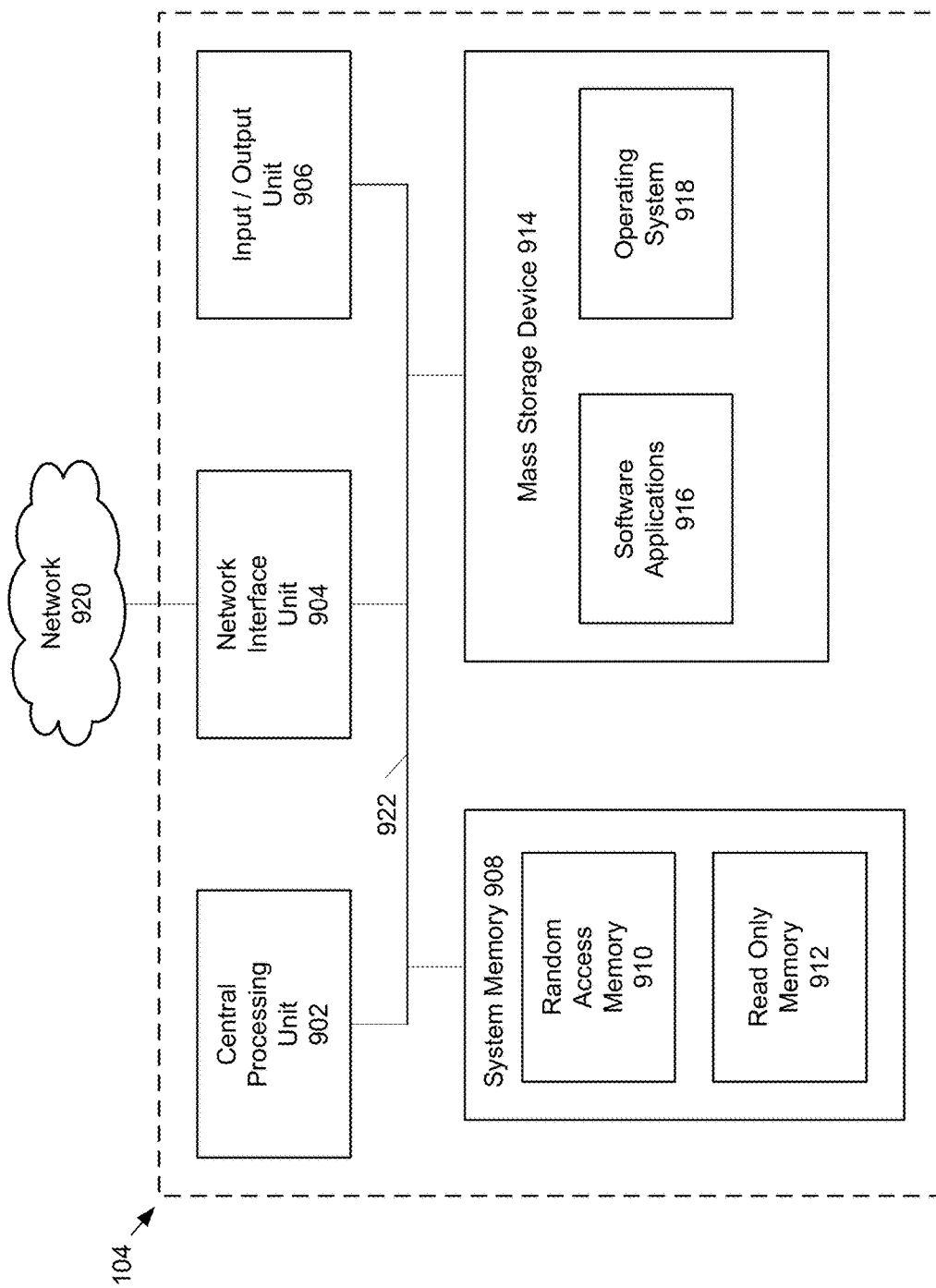
FIG. 9 shows example physical components of the AR headset of FIG. 1.

As illustrated in the example of FIG. 9, the AR headset 104 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system contains the basic routines that help to transfer information between elements within the AR headset 104, such as during startup, is stored in the ROM 912. The AR headset 104 further includes a mass storage device 914. The mass storage device 914 is able to store software instructions and data. A central processing unit, system memory and mass storage device similar to that in FIG. 9 are also included in server computer 102.

The mass storage device 914 is connected to the CPU 902 through a mass storage controller (not shown) connected to the system bus 922. The mass storage device 914 and its associated computer-readable data storage media provide non-volatile, non-transitory storage for the AR headset 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 102.

According to various embodiments of the invention, the AR headset 104 may operate in a networked environment using logical connections to remote network devices through the network 920, such as a wireless network, the Internet, or another type of network. The AR headset 104 may connect to the network 920 through a network interface unit 904 connected to the system bus 922. It should be appreciated that the network interface unit 904 may also be utilized to connect to other types of networks and remote computing systems. The AR headset 104 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the AR headset 104 can store software instructions and data. The software instructions include an operating system 918 suitable for controlling the operation of the AR headset 104. The mass storage device 914 and/or the RAM 910 also store software instructions, that when executed by the CPU 902, cause the AR headset 104 to provide the functionality of the AR headset 104 discussed in this document. For example, the mass storage device 914 and/or the RAM 910 can store software instructions that, when executed by the CPU 902, cause the AR headset 104 to display received financial data on the display screen of the AR headset 104.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an augmented reality electronic device, the method comprising:
    viewing at least a portion of a financial document with the augmented reality electronic device;
    identifying one or more words or phrases in a section of the financial document using the augmented reality electronic device;
    identifying an account identification number associated with the financial document using the augmented reality electronic device;
    authenticating a user of the augmented reality device;
    after authenticating the user, logging on to a financial account of the user identified by the account identification number;
    sending the one or more words or phrases and the account identification number to a server computer;
    as a result of sending the one or more words or phrases and the account identification number to the server computer, receiving a textual message from a virtual agent of a financial institution, the textual message identifying customized financial content related to the one or more words and phrases and related to the financial account of the user, the textual message inquiring as to whether the user wishes to the view the customized financial content;
    projecting an overlay of an image of the virtual agent on the augmented reality electronic device, the image including the textual message and one or more virtual buttons that permit a selection of the customized financial content;
    receiving a selection of one of the virtual buttons;
    as a result of receiving the selection of the one of the virtual buttons, displaying an information area on a display screen of the augmented reality electronic device, the information area including: (i) a first area with a control that, when activated, displays on the display screen details regarding a bank credit card rewards program; (ii) a second area with a control that, when activated, provides details for making an appointment with a personal banker; and (iii) a third area with a control that, when activated, initiates a telephone call to the personal banker, the information area being displayed below the image of the virtual agent on the display screen;
    receiving a selection of one control from one of the first area, the second area or the third area of the information area;
    receiving the customized financial content corresponding to the selection;
    projecting the customized financial content on the augmented reality electronic device;
    detecting that the user has looked away from the financial document for greater than a predetermined period of time; and
    as a result of detecting that the user has looked away from the financial document for greater than the predetermined period of time, logging off from the financial account for the user.

2. The method of claim 1, wherein the augmented reality electronic device is a headset.

3. The method of claim 2, wherein the headset comprises a wearable computer with a camera and an optical head-mounted display.

4. The method of claim 1, wherein the augmented reality electronic device is a mobile electronic computing device, the mobile electronic computing device including an augmented reality software application.

5. The method of claim 1, wherein the financial document is a portfolio management account statement for the customer.

6. The method of claim 1, wherein the financial document is a banking statement.

7. The method of claim 1, wherein projecting the customized content comprises displaying an account balance trend for the customer.

8. The method of claim 1, wherein displaying the customized content comprises displaying marketing information related to the financial document.

9. The method of claim 1, wherein the display of the customized content overlays a display of the financial document on the augmented reality electronic device.

10. The method of claim 1, further comprising enabling the customer to take an action on the augmented reality electronic device based on the displayed customized content.

11. The method of claim 10, wherein the action comprises paying a bill.

12. The method of claim 10, wherein the action comprises enrolling for a financial service.

13. A method implemented on an augmented reality electronic device, the method comprising:
    viewing at least a portion of a financial document with the augmented reality electronic device;
    identifying one or more words or phrases in a section of the financial document using the augmented reality electronic device;
    obtaining an identification for a customer from a section of the financial document;
    sending the one or more words or phrases and the identification of the customer to a server computer;
    as a result of sending the one or more words or phrases and the identification of the customer to the server computer, receiving a textual message from a virtual banker of a financial institution, the textual message identifying a balance trend of a financial account of the customer, the balance trend being identified based on an analysis of the one or more words and phrases, the textual message inquiring as to whether the user wishes to the view the balance trend;

projecting an overlay of an image of the virtual banker on the augmented reality electronic device, the image including the textual message and one or more virtual buttons that permit a display of the balance trend;

receiving a selection of one of the virtual buttons;

as a result of receiving the selection of the one of the virtual buttons, receiving data relating to the balance trend;

projecting a graph showing the balance trend on the augmented reality electronic device, the graph showing a trend of assets and liabilities for the customer, the graph including a plurality of additional virtual buttons, a first additional virtual button permitting a display of the balance trend over one time period, a second additional virtual button permitting a display of the balance trend over a different time period, and a third additional virtual button permitting initiation of a telephone call with a personal banker;

detecting that the user has looked away from the financial document for greater than a predetermined period of time; and as a result of detecting that the user has looked away from the financial document for greater than the predetermined period of time, logging off from a financial account for the user.

14. The method of claim 13, wherein the augmented reality electronic device is a headset comprising a wearable computer with a camera and an optical head-mounted display.

15. The method of claim 13, wherein the augmented reality electronic device is a mobile electronic computing device, the mobile electronic computing device including an augmented reality software application.

16. An augmented reality electronic computing device comprising:

a processing unit; and system memory, the system memory including instructions which, when executed by the processing unit, cause the augmented reality electronic computing device to:

view at least a portion of a financial document;

identify one or more words or phrases in a section of the financial document identify an account identification number associated with the financial document;

authenticate a user of the augmented reality device;

after authenticating the user, log on to a financial account of the user identified by the account identification number;

send the one or more words or phrases and the account identification number to a server computer;

as a result of sending the one or more words or phrases and the identification of the customer to the server computer, receive a textual message from a virtual banker of a financial institution, the textual message identifying information regarding a financial account of the customer that the virtual banker would like to discuss with the customer, the information related to the financial account of the customer being identified based on an analysis of the one or more words and phrases, the textual message inquiring as to whether the user would like to view a balance trend of the financial account;

project an overlay of an image of the virtual banker on the augmented reality electronic device, the image including the textual message and one a virtual button that permits the display of the balance trend of the financial account;

receive a selection of the virtual button;

as a result of receiving a selection of the virtual button, receiving data relating to the balance trend of the financial account;

projecting a graph showing the balance trend of the financial account on the augmented reality electronic device, the graph showing a trend of assets and liabilities for the customer, the graph including a plurality of additional virtual buttons, a first additional virtual button permitting a display of the balance trend over a 12-month period, a second additional virtual button permitting a display of the balance trend over a 6-month period, and a third additional virtual button permitting initiation of a telephone call with a personal banker;

display the customized content;

detect that the user has looked away from the financial document for greater than a predetermined period of time; and as a result of detecting that the user has looked away from the financial document for greater than the predetermined period of time, log off from the financial account for the user.

17. The augmented reality electronic computing device of claim 16, wherein the augmented reality electronic computing device is a headset comprising a wearable computer with a camera and an optical head-mounted display.

18. The augmented reality electronic computing device of claim 16, wherein the augmented reality electronic computing device is a mobile electronic computing device, the mobile electronic computing device including an augmented reality software application.

* * * * *